Dec. 28, 1965  F. E. ROMESBERG ETAL  3,226,462
PROCESS FOR PRODUCING MICROPOROUS FILMS
Filed Oct. 12, 1961
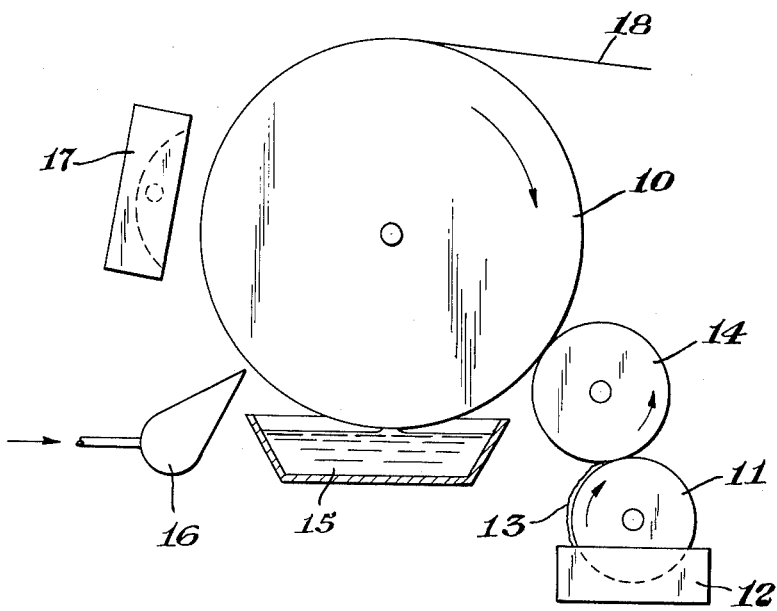
INVENTORS.
Floyd E. Romesberg
Robert J. Mathieson
Lloyd E. Lefevre
BY
AGENT United States Patent Office 3,226,462
Patented Dec. 28, 1965

3,226,462
PROCESS FOR PRODUCING MICROPOROUS FILMS
Floyd E. Romesberg, Midland, Robert J. Mathieson, Rhodes, and Lloyd E. Lefevre, Bay City, Mich., assignors to The Dow Chemical Company, Midland, Mich., a corporation of Delaware
Filed Oct. 12, 1961, Ser. No. 144,573
5 Claims. (Cl. 264—216)

This application is a continuation-in-part of U.S. Serial No. 647,632, filed March 21, 1957, now abandoned.

This invention relates to a process for producing microporous films and tapes.

Microporous films and screens have found use as battery separators, filters, and the like. As commonly prepared, those films consist of a compacted admixture of incompatible but fusible materials. The porosity of those articles is determined in large measure by the particle size of the dry ingredients and by the pressure applied. It is difficult to obtain uniform distribution of each of the incompatible materials throughout the mixture. Further, such heterogeneous articles lack strength and other desirable properties. Other prior methods for making such films and screens have consisted of incorporatng certain additives into a material, forming the material into the desired shape, and dissolving or otherwise removing the additive from the material. All of those methods involve several time-consuming and relatively expensive procedural steps. The thermoplastic polymers and copolymers are capable of easy processability by many techniques, are capable of being prepared in fairly uniform particle sizes, are inexpensive and readily available, and have physical and chemical properties which would make them useful materials for preparing such articles.

Accordingly, it is an object to provide a process for preparing microporous thermoplastic films.

It is a still further object to provide such a process whereby such films are prepared directly from a latex of a copolymer.

It has now been found that novel microporous thermoplastic films may be prepared by a process whereby a non-porous deposition base is wetted with a coagulant solution for the latex to be employed, then is coated with the latex, the resulting film is next washed to remove substantially all of the coagulant, and finally is dried at a temperature below the fusion temperature of the copolymer.

The process is illustrated by the annexed drawing and the following descriptions which represent a preferred and illustrative mode for carrying out the steps of the process.

In the embodiment illustrated, a large rotatably driven smooth surfaced drum 10 is used as a casting surface. The surface 10 of the drum is first wetted with aqueous electrolyte coagulant solution. The wetting is conveniently accomplished using a transfer roll technique wherein a pickup roll 11 rotating partially in a coagulant bath 12 is in contact with a transfer roll 14 which in turn is in contact with the durm 10. Roll 11 picks up a film of aqueous coagulant 13, transfers it to roll 14 onto the surface of roll 10. As the drum 10 rotates further, the wetted surface dips into a latex bath 15 forming a wet latex-coagulant film. Excess water and latex are removed from the wet film by a planiform air blast sometimes called an air knife 16 which is directed at a slight angle to the surface of the wet film. The rotating drum surface 10 next passes under a radiant heating means such as a quartz bar heater which strengthens and conditions the film without destroying its porosity. The dried microporous film 18 is then stripped from the surface 10 of the rotating drum.

The process of this invention is peculiarly adaptable to the preparation of microporous films of certain vinylidene chloride copolymers. Thus, it has been found that when the latex employed is one prepared by the emulsion polymerization of from 90 to 99 percent by weight of vinylidene chloride and correspondingly from 10 to 1 percent by weight of acrylonitrile or of a lower alkyl acrylate having from 1 to about 4 carbon atoms in the alkyl group, the product resulting from the process is the desired microporous film. When the copolymer composition of the latex is outside of these limits, there either results no continuous film or the film has no appreciable porosity or strength.

The latexes may be prepared by any of the known procedures for polymerization in aqueous emulsion. Typically the monomer or monomers are dispersed in an aqueous solution of from about 0.05 to 5 percent polymerization catalyst, such as potassium persulfate or hydrogen peroxide, and from about 0.05 to 5 percent of a surface-active agent capable of emulsifying the monomers. Many such surface-active agents are known. Polymerization is initiated by heating the emulsified mixture usually between 35° C. and 100° C. and is continued by maintaining the polymerizing emulsion at the selected temperature. After the polymerization has reached the desired conversion of monomer to polymer, the latex is filtered to remove any precoagulum and stabilized to storage if necessary by the addition of a further small amount of the same or a different surface-active agent.

Latexes which are to be used in forming continuous, coherent articles, such as films, should preferably contain from about 20 to about 50 percent by weight of non-volatile solids. When less than about 20 percent by weight of non-volatile solids are present in the latex, no useful, continuous, coherent articles can be produced by simple deposition of the latex. Latexes having appreciably more than 50 percent by weight of non-volatile solids are difficult to prepare and are extremely sensitive to mechanical shear and to storage and may coagulate prematurely. The latex solids also affect the relative porosity of the films. Those latexes having about 30 percent solids result in films of about 75 percent porosity and those having 50 percent solids give films of about 40 percent porosity.

In general the film-formability of a latex is dependent in large measure on the particle size of the copolymer forming the latex. In this process the particle size serves the further function of determining the pore size and in conjunction with the latex solids determines the porosity of the film. Latexes having relatively large particle sizes will usually result in films having greater porosity and having larger individual pores than will result from latexes having smaller particle sizes. The particle size is a function of the kind and concentration of emulsifier, the temperature of polymerization, and rate of agitation used in forming the initial dispersion. For this process it has been found that the latexes should preferably have particle sizes between about 500 to 1200 Angstrom units as measured from electron micrographs. The films resulting from such particle sizes contain from about 40 to about 75 percent porosity or void space. Although slightly larger or smaller particle sizes will result in a microporous film, the permeability of such a film prepared from a latex with appreciably smaller sizes will be poor. The films prepared from larger particle size latexes are weaker than those prepared from the indicated particle sizes, although where strength is not a criterion of use, particle sizes of up to 2000 Angstrom units may be used.

The film formability of the latex is also dependent upon the degree of crystallinity of the copolymer of the latex. When the latex is first formed, the vinylidene chloride-acrylonitrile or vinylidene chloride-alkyl acrylate copolymer is predominantly in the amorphous state but upon aging gradually crystallizes. After a certain amount of crystallinity has formed, the latex is no longer film forming by simple deposition. The latex, having reached the limit of crystallinity, cannot be restored to its original state. It is to be preferred, therefore, to carry out the process of the invention as soon as possible following polymerization. The rate of crystallization can be retarded somewhat by leaving any unpolymerized monomer in the latex or by adding a minor amount of monomer to the fresh latex.

The deposition base may be any solid, non-porous surface which is inert to or not corroded by the latex and coagulant solution. A most satisfactory surface is created by covering a steel roll or belt with a polysiloxane rubber.

The coagulants for polymer latexes are well known. Typically, such coagulants are water-soluble, polyvalent metal salts, such as magnesium and calcium chlorides. The coagulant is usually employed in a concentration of from about 5.0 to 40 percent by weight and the minimum concentration required to coagulate the latex is to be preferred. Using more than the minimum necessitates excessive washing of the coagulum to remove the coagulant. It may be desirable to achieve more uniform wetting of the deposition base to incorporate into the aqueous coagulant solution a small amount of wetting agent.

In operation, the process consists of first wetting the surface of the deposition base by immersing the base in the coagulant solution, by spraying, by transfer roll techniques, or by other known procedure. If necessary, excess coagulant solution may be allowed to drain off the base. Before drying, the wetted base is then contacted with the latex. To assure a film of uniform thickness, it is necessary that the amount of latex coagulated be consistently uniform. This may be achieved by metering the latex onto the wetted base or by immersing the wetted base in the latex followed by removal of the excess with a planiform air blast, sometimes called an air knife, which may be directed tangentially or at a slight angle to the surface of the wet film. The wet, porous coagulum is then washed until substantially all of the coagulant is removed. In most cases the wet coagulum is self-supporting in a few seconds after its formation and may be stripped from the base for washing. Following washing, the wet washed coagulum is allowed to drain and is then dried at a temperature below the fusion temperature of the polymer and preferably between from 100° C. to 140° C. When the drying is carried out below 100° C., the drying step is unnecessarily long. When the wet coagulum is dried above the fusion temperature, the result is an impermeable fused film.

The process is readily adaptable to either continuous or discontinuous operation. When continuous operation is desired, it is only necessary to provide a continuous deposition base, such as an endless belt or a roll. If discontinuous operation is desired, the deposition base may consist of individual paddles or surfaces which may be sequentially coated with coagulant and latex.

The microporous film resulting from this process is characterized by having a plurality of interconnecting labyrinthine passages extending completely through the thickness of the film. The actual sizes of the pores are incapable of accurate measurement, but the films are permeable to gases and water. Some films have been prepared which have filtered away from aqueous dispersions solid particles of 700 Angstrom units average diameter. Such films are ideally suited for use as filters. The films may be prepared in any thickness from about 0.001 to 0.2 inch, preferably from about 0.001 to 0.01 inch. When the coagula are of such thickness as to result in a film of greater than about 0.01 inch, care must be taken to dry such coagula slowly to prevent the formation of a non-porous skin on the film.

The operation and advantages of the process and of the resultant microporous films will be more apparent from the following illustrative example wherein all parts and percentages are by weight.

*Example*

A polymer latex was prepared by polymerizing 97 percent vinylidene chloride and 3 percent acrylonitrile in aqueous emulsion at 60° C. using potassium persulfate as catalyst and 2 percent sodium alkyl sulfosuccinate as emulsifier. The latex contained 36 percent non-volatile solids and an average particle size of 700 Angstrom units. A polysiloxane belt was wetted with a 20 percent aqueous solution of calcium chloride. The wetted belt surface was brought into contact with a bath of latex and the excess adherent latex was removed with an air knife. The wet coagulum was washed and then dried at 130° C. into a microporous film 0.002 inch in thickness. Strips of the film were cut out and evaluated as filters in comparison with No. 42 "Whatman" paper. A pigment dispersion was prepared by grinding pigment into particles of about 2 microns diameter and dispersing them in water. The dispersion was filtered under reduced pressure. When the film of this invention was used, the filtrate was clear, but when the filter paper was employed, the particles readily passed through into the filtrate.

As a further check, a sample of the uncoagulated latex was filtered through a piece of the microporous film and the filtrate was again relatively clear.

A similar result was observed when the latex employed was one of a copolymer of 96 percent vinylidene chloride and 4 percent ethyl acrylate. In addition, similar results are noted when the latex is of a copolymer of vinylidene chloride and from 1 to 10 percent of methyl, propyl, or butyl acrylate.

What is claimed is:

1. A process for preparing microporous films comprising the steps of (1) wetting a non-porous deposition base with a liquid consisting essentially of an aqueous solution of an electrolyte coagulant, (2) contacting the wetted deposition base with a latex, prepared by the emulsion polymerization of from 90 to 99 percent by weight of vinylidene chloride and correspondingly from 10 to 1 percent by weight of a comonomer selected from the class consisting of acrylonitrile and lower alkyl acrylate having from 1 to 4 carbon atoms in the alkyl group containing from 20 to 50 percent by weight of copolymer solids and predominantly in the amorphous state, (3) removing excess latex from said deposition base, (4) washing the so-formed coagulum, and (5) drying said coagulum at a temperature below the fusion point of the copolymer.

2. The process claimed in claim 1 wherein said lower alkyl acrylate is ethyl acrylate.

3. The process claimed in claim 1 wherein the aqueous coagulant solution is one of the water-soluble multivalent inorganic salt.

4. The process claimed in claim 1 wherein said latex has an average particle size of from 500 to 1200 Angstrom units.

5. The process claimed in claim 1 wherein said coagulum is dried at a temperature between 100° C. and 140° C.

References Cited by the Examiner

UNITED STATES PATENTS

| | | | |
|---|---|---|---|
| 2,414,391 | 1/1947 | Peaker | 18—58.4 |
| 2,414,394 | 1/1947 | Rumbold | 18—58.4 |
| 2,438,480 | 3/1948 | Stanton | 260—86.3 XR |
| 2,530,362 | 11/1950 | Morris. | |
| 2,559,750 | 7/1951 | Berry. | |
| 2,707,805 | 5/1955 | Smith et al. | 18—57 |
| 2,710,426 | 6/1955 | Platzer et al. | 18—57 |
| 2,858,186 | 10/1958 | Frost | 18—57 XR |
| 2,880,466 | 4/1959 | Gunderman et al. | 18—57 |
| 2,884,387 | 4/1959 | Bieber et al. | 260—2.5 |
| 2,914,808 | 12/1959 | Adams | 18—58.6 XR |

OTHER REFERENCES

Vanderbilt Latex Handbook; R. T. Vanderbilt Co. Inc., 1954; N.Y. 17, N.Y.; pages 25 and 26 relied upon.

ALEXANDER H. BRODMERKEL, *Primary Examiner.*

MICHAEL V. BRINDISI, *Examiner.*